(12) United States Patent
Nishimura et al.

(10) Patent No.: US 8,647,784 B2
(45) Date of Patent: Feb. 11, 2014

(54) FUEL CELL STACK START METHOD PREVENTING CATHODE DETERIORATION

(75) Inventors: Katsunori Nishimura, Hitachiota (JP); Kenji Yamaga, Hitachi (JP); Osamu Kubota, Tokai (JP); Ko Takahashi, Mito (JP)

(73) Assignee: Hitachi, Ltd., Tokyo (JP)

(*) Notice: Subject to any disclaimer, the term of this patent is extended or adjusted under 35 U.S.C. 154(b) by 177 days.

(21) Appl. No.: 12/920,432

(22) PCT Filed: Nov. 18, 2009

(86) PCT No.: PCT/JP2009/006193
§ 371 (c)(1),
(2), (4) Date: Nov. 30, 2010

(87) PCT Pub. No.: WO2010/058566
PCT Pub. Date: May 27, 2010

(65) Prior Publication Data
US 2011/0065013 A1 Mar. 17, 2011

(30) Foreign Application Priority Data
Nov. 19, 2008 (JP) .................. 2008-295043

(51) Int. Cl.
*H01M 8/04* (2006.01)
*H01M 8/10* (2006.01)
(52) U.S. Cl.
USPC ........... 429/429; 429/432; 429/465; 429/479; 429/514
(58) Field of Classification Search
USPC .......... 429/429, 428, 447, 432, 479, 465, 514
See application file for complete search history.

(56) References Cited

U.S. PATENT DOCUMENTS 3,395,045 A * 7/1968 Ruetschi ................. 429/445
2002/0076585 A1 * 6/2002 Mund ..................... 429/17
(Continued)

FOREIGN PATENT DOCUMENTS

JP 2006-140065 6/2006
JP 2006-164939 6/2006
(Continued)

OTHER PUBLICATIONS

Machine Translation of: JP-2006/140065 A1, Takaichi, S., Jun. 2006.*
(Continued)

*Primary Examiner* — Kenneth Douyette
(74) *Attorney, Agent, or Firm* — Antonelli, Terry, Stout & Kraus, LLP.

(57) ABSTRACT

A fuel cell stack start method is to provide in which without relying on oxidation and reduction condition of an anode, an output reduction of the fuel cell stack can be avoided.
In the start method of a solid polymer type fuel cell stack that is comprised of a separator including an anode flow channel for flowing a fuel, another separator including a cathode flow channel for feeding an oxidant and electrodes and an electrolyte interposed between the separators, the method is characterized by performing successively a first step of feeding the fuel to the fuel cell stack under a condition that a cathode is covered by generated water, a second step of forming an oxide layer on the cathode, a third step of feeding the oxidant gas to the fuel cell stack and a fourth step of extracting load current from the fuel cell stack.

8 Claims, 5 Drawing Sheets

(56) References Cited

U.S. PATENT DOCUMENTS

| | | | |
|---|---|---|---|
| 2002/0122963 A1* | 9/2002 | Buchner et al. | 429/13 |
| 2008/0090111 A1* | 4/2008 | Kim et al. | 429/13 |
| 2008/0241619 A1* | 10/2008 | Tomimatsu et al. | 429/23 |

FOREIGN PATENT DOCUMENTS

| | | |
|---|---|---|
| JP | 2007-018858 | 1/2007 |
| JP | 2007-018987 | 1/2007 |
| JP | 2007-059278 | 3/2007 |
| JP | 2007-284674 | 3/2007 |
| JP | 2007-179749 | 7/2007 |
| JP | 2008-176940 | 7/2008 |
| WO | WO 2007/088471 | 8/2007 |

OTHER PUBLICATIONS

Electrochemical and Solid-state Letters, "A Reverse-Current Decay Mechanism for Fuel Cells," by Carl A. Reiser, et al., vol. 8, No. 6, 2005, A273-A276.

New Energy and Industrial Technology Development Organization, Intermediate Annual Report of 2006 Year, Technical Development Relating to Fundamental and Common Tasks for Strategic Technical Development for Practical Implementation of Solid Polymer Type Fuel Battery, Basic Study on Deterioration of Solid Polymer Type Fuel-Cell Battery Stack and Analysis thereof (Basic study of supporting relating to stack deterioration mechanism clarification, bar code No. 100011080).

2nd Chinese Office Action, Chinese Patent Application No. 2009801059419, May 29, 2013.

* cited by examiner

FUEL CELL STACK START METHOD PREVENTING CATHODE DETERIORATION

FIELD OF THE INVENTION

The present invention relates to a method of starting a fuel cell stack and a fuel cell stack generation system for carrying out the method.

BACKGROUND ART

A solid polymer type fuel cell stack using reformed fuel of hydrogen or liquid organic compound, or another solid polymer type fuel cell stack using fuel of liquid organic compound such as methanol, ethanol and dimethyl ether, has characteristics of low operation noises, low operation temperature (about 70~80° C.) and easy fuel feeding. For this reason, a broad application thereof is expected for such as a portable type power source, a power source for electric cars and a power source used for light weighted vehicles such as electrically powered motorcycles, power assisting type bicycles and further including wheelchairs used for medical and nursing service and mobility scooter.

Among these fuel-cell batteries, with regard to a solid polymer type fuel cell stack using a fuel gas such as hydrogen, when feeding hydrogen to an anode or when feeding air to a cathode at the time of starting, it is reported that the cathode suffers from abnormal oxidation reaction, and thereby the cathode catalyst is gradually deteriorated through the repetition of start and stop thereof (herein after, called as start-stop cycle) (non-patent document 1).

This deterioration is considered caused by a reverse current mechanism due to a local high potential condition of the cathode.

On the other hand, in order to avoid such deterioration due to oxidation of the cathode catalyst, there are provided varieties of start methods. For example, such methods have been proposed as a method of feeding air in stewise manner to a cathode (patent document 1), a start method of a fuel cell stack power generation system characterized of including an operation of reducing a cathode electrode potential gradient in a cell in association with initiating oxidant feed at the time of starting during starting power generation of the fuel cell stack power generation system (patent document 2), and a start method including a plurality of steps such as a step of discharging the fuel battery without feeding fuel and oxidant (patent document 3).

PRIOR ART DOCUMENT

Patent Document

Patent Document 1: JP-A-2007-284674
Patent Document 2: JP-A-2007-18987
Patent Document 3: JP-A-2008-176940

Non-Patent Document

Non-Patent Document 1: Electrochemical and Solid-state Letters, Vol. 8, No. 6, 2005, A273~A276
Non-Patent Document 2: New Energy and Industrial Technology Development Organization, Intermediate Annual Report of 2006 year, Technical Development Relating to Fundamental and Common Tasks for Strategic Technical Development for Practical Implementation of Solid Polymer Type Fuel Cell Stack, Basic Study on Deterioration of Solid Polymer Type Fuel cell stack and Analysis thereof (Basic study of supporting relating to stack deterioration mechanism clarification, bar code number 100011080)

SUMMARY OF THE INVENTION

Tasks to be Solved by the Invention

The present inventors have tried to develop a new start method different from conventional art for preventing deterioration of cathode due oxidation by the start-stop cycle. During the development study, it has been noted that there is a substantial problem in the conventional art, since although the deterioration of cathode due to oxidation is caused by a local potential difference at the time of the oxidant feeding, however, it is insufficient for a practical use to make use of a countermeasure for preventing generation of the local potential difference at the time of the oxidant feeding during starting of a solid polymer type fuel cell stack.

At first, when an anode is under a condition of oxidation, or when an amount of hydrogen remaining in an anode flow channel is short, only feeding hydrogen thereto does not solve the problem of suffering the cathode from deterioration due to oxidation. There is still remained a problem of cathode deterioration due to so called reverse current.

At the upstream portion of a flow channel where hydrogen is fed, an oxidation reaction of hydrogen occurs at the anode (the following formula 1), and a reduction reaction of oxygen occurs at the cathode which is an opposite side to the anode (the following formula 2), thereby, a normal electromotive force is generated. However, at the downstream portion of the flow channel where hydrogen is supplied, there is caused a reaction that compensates electrons necessary for the reduction of oxygen at the cathode by the oxidation reaction of the cathode itself (the following formulas 3 and 4). By formation of such a local cell, elution of platinum catalyst for the cathode and oxidation of a conductive material for the cathode are caused, and the performance of the cathode gradually decreases.

$$H_2 \rightarrow 2H^+ + 2e^- \qquad \text{formula 1}$$

$$\tfrac{1}{2}O_2 + 2H^+ + 2e^- \rightarrow H_2O \qquad \text{formula 2}$$

$$Pt \rightarrow Pt^{2+} + 2e^- \qquad \text{formula 3}$$

$$C + 2H_2O \rightarrow CO_2 + 4H^+ + 4e^- \qquad \text{formula 4}$$

In particular, when restarting a power generation system mounting a solid polymer type fuel cell stack (herein below, will be called as a PEFC power generation system) after a long interval stop thereof or when starting for the first time after installing the system at a customer, it becomes difficult to avoid the cathode oxidation due to the local current and reverse current because the anode is under the oxidation condition.

As described above, since the anode condition of oxidation or reduction changes depending on whether there is hydrogen in the anode flow channel, there was a problem that the start sequence has to be selected depending on the respective conditions. From a view point of controlling the system, a start method is desirable that is independent from the anode condition of oxidation or reduction.

A primary problem of cathode deterioration due to oxidation is because the oxygen reduction reaction (formula 2) is caused on the cathode by being affected strongly by the hydrogen oxidation reaction (formula 1) on the anode. A first subject to be solved by the present invention is to avoid occurrence of the formula 2 reaction at the time of the fuel feeding.

A secondary problem is that, even when an anode is under a reduction condition and no reverse current is caused at the time of the fuel feeding, cathode deterioration reaction due to oxidation (formulas 3, 4) may occur only by feeding air to the cathode.

When the cathode is under reduction condition at the time of stopping the system, the upstream of the cathode flow channel is rapidly rendered to an oxidation condition immediately after air is fed to the cathode. Namely, the formula 2 reaction rapidly advances. As a result, two electrons necessary for the formula 2 reaction are caused supplied from the downstream side of the cathode flow channel. Namely, the same phenomenon as the reverse current mechanism as explained in connection with the primary problem is caused, and the cathode deterioration reaction due to oxidation advances (formulas 3 and 4).

A second subject to be solved by the present invention is to avoid the formula 2 reaction at the time of the oxidant feeding.

As will be seen from the above, in order to solve the primary and secondary technical problems, it is understood that the formula 2 reaction is a key point reaction.

An object of the present invention is to provide a fuel cell stack start method capable of preventing cathode deterioration due to oxidation without depending on oxidation and reduction condition of the anode.

Measure for Solving the Problems

As a result of studying eagerly for solving the two technical problems of the conventional art, the present inventors can have reached a new fuel cell start method and a system for carrying out the same. The present invention provides a method of effectively preventing the advancement of the formula 2 reaction (a method of suppressing oxygen reduction) by (1): covering a cathode with generated water to thereby interrupt contact between the cathode and oxygen, and by (2): forming an oxide layer on the surface of cathode catalyst particles to thereby substantially suppress a voltage rise. Herein below, the measure therefor will be explained.

A primary means to resolve such problems is a start method of a solid polymer type fuel cell stack that is comprised of a separator including an anode flow channel for flowing a fuel, another separator including a cathode flow channel for oxidant feeding, and electrodes and an electrolyte which are interposed between the separators; the method is characterized by a first step of feeding a fuel to the fuel cell stack under a condition that a cathode is covered by generated water, a second step of forming an oxide layer on the cathode, a third step of feeding oxidant gas to the fuel cell stack and a fourth step of extracting a load current from the fuel cell stack.

A secondary means is a fuel cell stack start method depending on the primary means, the method is characterized by, in the first step, judging whether or not time difference between the latest stop time of the battery and the current time exceeds a predetermined time period, and when judging that the difference exceeds the predetermined time period, carrying out an operation of flowing current to the fuel cell stack by making use of an external current control means.

A third means is a fuel cell stack start method depending on the first means, the method is characterized by, in the first step, judging whether or not voltage between terminals of the fuel cell stack exceeds a predetermined voltage, and when judging that the voltage exceeds the predetermined voltage, carrying out an operation of flowing current to the fuel cell stack by making use of an external current control means.

A fourth means is a fuel cell stack start method depending on the first means, the method is characterized by, in the second step, carrying out an operation of flowing current to the fuel cell stack by making use of an external current control means.

A fifth means is a fuel cell stack start method depending on the fourth means, the method is characterized in that the external current control means is the one for applying a DC voltage between the voltage terminals of the fuel cell stack and the DC voltage is set to be equal to or more than 0.5 V and equal to less than 0.8 V.

In order to carrying out the first means, a sixth means uses a fuel cell stack system that comprises a fuel flowing line including a piping and an open/close device for feeding a fuel to a fuel cell stack, and a piping for discharging fuel exhaust gas from the fuel cell stack, an oxidant flowing line including a piping and an open/close device for feeding an oxidant to the fuel cell stack and a piping for exhausting oxidant exhaust gas from the fuel cell stack, an external current controller provided with a function of flowing current to the fuel cell stack and a computing circuit for operating the open/close devices and the external current controller.

Advantages of the Invention

By means of the fuel cell stack start method according to the present invention, the cathode deterioration due to oxidation can be prevented without depending on oxidation and reduction condition of the anode, and an output reduction of the fuel cell stack can be avoided.

EMBODIMENTS FOR CARRYING OUT THE INVENTION

A technical problem to be solved by the present invention is, in a starting process until extracting power to outside by feeding a fuel containing hydrogen into a fuel flow channel and feeding an oxidant into an oxidant flow channel, to prevent cathode deterioration due to oxidation. However, the fuel is not limited to hydrogen, if gas or vapor that can be oxidized (for example, such as methanol and dimethyl ether) at the anode is used, the present application can be applied.

At first, constitution of a fuel cell stack to which the present invention is applied will be explained, thereafter, a concept of the present invention will be explained in detail.

Figure 1:
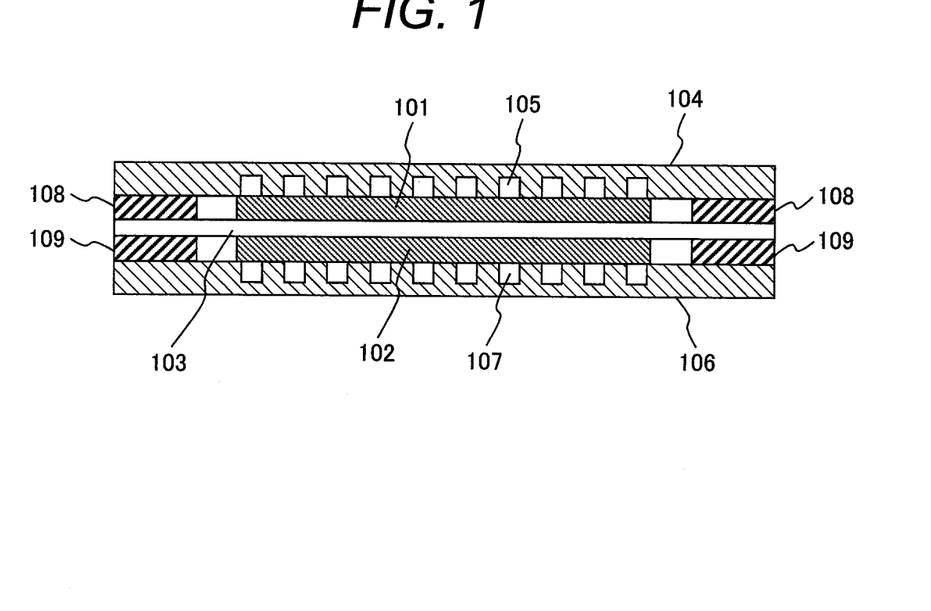
FIG. 1 shows a cross sectioned structure of a unit cell of the present invention.

FIG. 1 shows a cross sectional structure of a unit cell of a fuel cell stack to which the present invention is applied. At the center of the unit cell cross section, a membrane-electrode assembly (herein below will be called as an MEA) is provided. This MEA is constituted in a three layered structure that is formed by laminating an anode 101 on the upper face of an electrolytic membrane 103 and a cathode on the lower face thereof. A fuel side separator 104 includes fuel flow channels 105 of which flow channel face is disposed so as to be adjacent to the anode 101. An oxidant side separator 106 includes oxidant flow channels 107 of which flow channel face contacts to the cathode 102. Along the outer circumferences of the separators, gaskets 108 and 109 are provided so as not to leak out fuel and oxidant to outside as well as not to leak out one of the reaction substances into the flow channels of the other reaction substance.

As a separator material, any separator materials such as a graphite separator formed from graphite and a binder such as phenol resin and a metal separator using a mother material such as stainless steel and titanium can be selected. Further, a complex separator can be used, which is formed by applying hydrophilic processing to these separators or by adding as electroconductive material and anti-corrosive material thereto.

The width and depth of the fuel channel 105 can be set at an optimum size depending on the kind of fuel and the flow rate thereof. When the channel width becomes too much broader, since the contact resistance between the separator and the MEA increases, it is particularly desirable to set the channel width in a rage of 1~5 mm and the channel depth in a range of 0.3~5 mm. Likely, with regard to the oxidant flow channel 107, it is suitable to set the channel width in a rage of 1~5 mm and the channel depth in a range of 0.3~5 mm.

Figure 2:
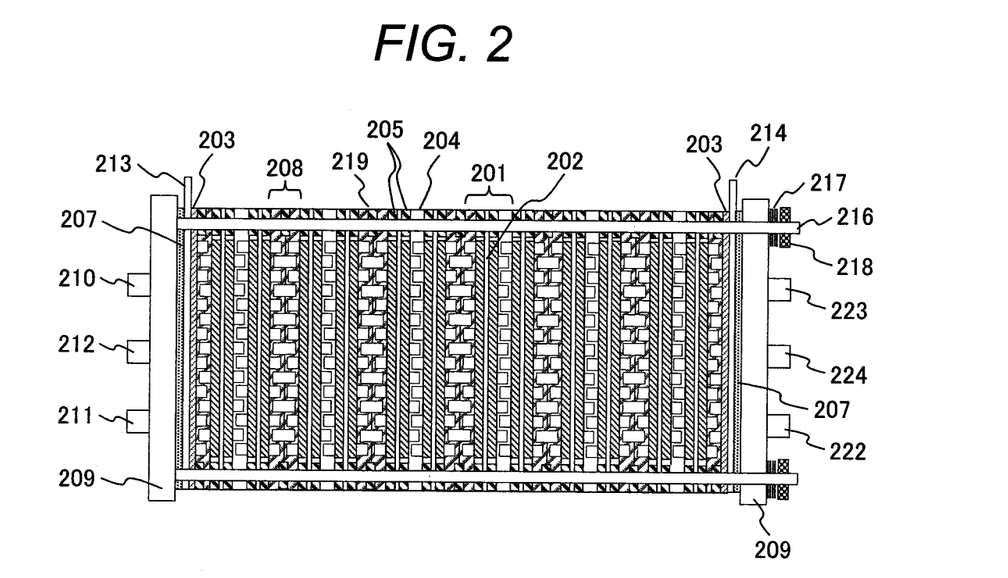
FIG. 2 shows a cross sectioned structure of a fuel cell stack of the present invention.

Next, a constitution of a cell stack formed by laminating the unit cells as shown in FIG. 1 will be explained. FIG. 2 exemplified a cross sectional structure of a solid polymer type fuel cell stack having rated output of 1 kW.

A portion corresponding to the unit cell as in FIG. 1 is a unit cell 201 in FIG. 2. Between the two sheets of separators 204 and 219, the gasket 205, the electrolyte (namely a part of the electrolyte, the part where the cathode and the anode are not formed) of the MEA 202 and the other gasket 205 are laminated in this order and press-fitted, thereby, leakage of fuel and oxidant can be prevented. Further, on the other face of the separator 219 constituting the unit cell, flow channels for flowing cooling water are formed, each of which constitutes a cooling cell 208 for removing heat from the unit cell.

The cathode is constituted by a catalyst layer and a gas diffusion layer. The catalyst layer is fixed on the surface of the electrolyte. This can be coated on the gas diffusion layer. Although the catalyst layer is generally formed by supporting fine platinum particles on graphite powders, other type catalysts can be used. The catalyst layer is formed by coupling each of the graphite powders by an electrolytic binder. The gas diffusion layer is provided on this catalytic layer.

The anode is also constituted by a catalyst layer and a gas diffusion layer. The catalyst layer is formed by supporting platinum fine particles on graphite powders or by supporting fine particles of the following alloy on the graphite powders. The alloy is formed from platinum and a co-catalyst such as ruthenium having a function of removing by oxidizing carbon monoxide produced during the fuel oxidation process. Further, the catalyst layer is formed by binding the graphite powder supporting the fine particles with electrolytic binder. Other catalysts, for example such as oxide catalysts can be used. After fixing one of these catalyst layers on the other face of the electrolyte, the gas diffusion layer is provided on the catalyst layer. Further, the anode catalyst layer coated on the gas diffusion layer can be used.

After a plurality of unit cells are connected to each other in series and current collector plates 213 and 214 are provided at both ends of them, the arrangement is further clamped from the outside with end plates 209 via insulator plates 207. When the end plate 209 is of an electrically insulating material, the insulator plate 207 can be omitted. As the clamping parts, bolts 216, springs 217 and nuts 218 are used. Other than the clamping structure as shown in FIG. 2, any structure can be used, and the structure is configured to hold the compressive force applied to both end plates 209 toward inner direction. Further, the faces of the cooling water flow channel of the cooling cell contacting to the current collectors 213 and 214 are formed by making use of flat plate parts 203.

A fuel is fed from a fuel supply connector 210 provided at the left side end plate 209, passes through respective unit cells 201, and after the fuel is oxidized on the anode of the MEA, is exhausted from a fuel exhaust connector 222 provided at the opposite side end plate 209. Herein, as the fuel, although hydrogen and gas containing hydrogen are in particular effective, other than these, organic vapor such as methanol dimethyl ether and liquid organic fuel such as methanol aqueous solution can be used.

Likely, an oxidant is fed from an oxidant supply connector 211 provided at the left side end plate 209 as shown in FIG. 2, and is exhausted from an oxidant exhaust use connector 223 provided at the opposite side end plate 209. Air was fed through a piping from a blower disposed at the outside of the fuel cell stack.

Cooling water is supplied from a cooling water supply use connector 212 provided at the left side end plate 209, and is discharged from a cooling water discharge connector 224 provided at the opposite side end plate 209. The cooling water discharged from here is heat removed by cooled water through a heat exchanger and is again supplied to the cooling water supply connector 212. A pump was used for the circulation of the cooling water. Further, the heat exchanger and the pump is omitted in illustration of FIG. 2.

By making use of the above parts and constitution, a cell stack is constituted by 25 unit cells 201. For check of hermetic sealing thereof, helium gas equivalent to 50 kPa with respect to atmospheric pressure is charged from piping connectors for fuel, oxidant and cooling water of this cell stack, and the internal pressure variation thereof was measured with a pressure sensor. It was confirmed through the measurement that the initial pressure of 50 kPa is kept high at 49.1 kPa even after 10 minutes and gas leakage to the outside little occurs.

Figure 3:
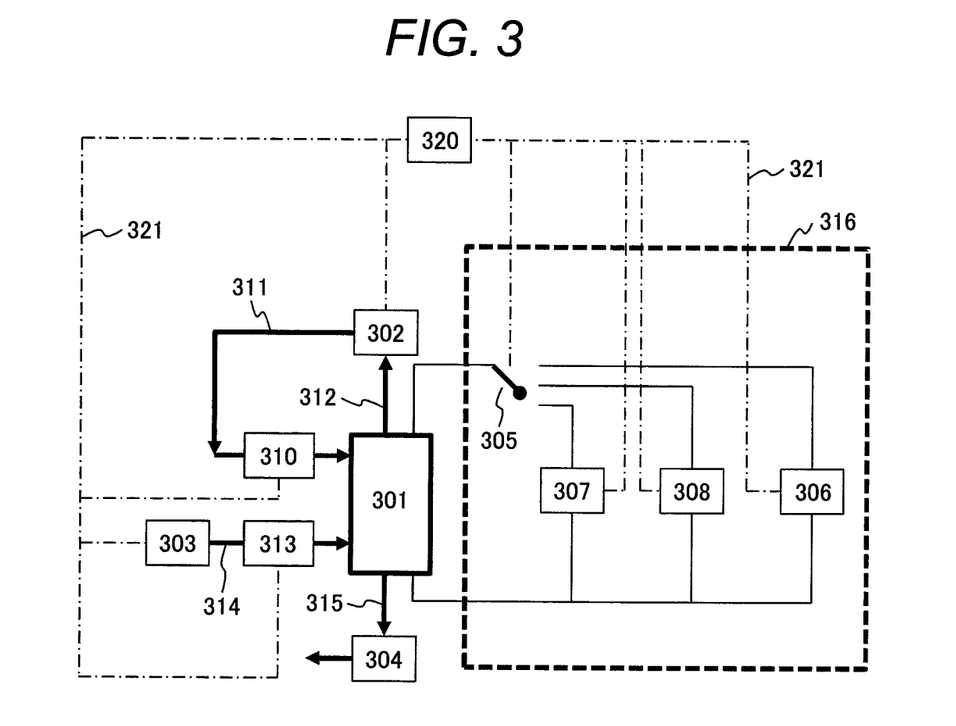
FIG. 3 shows a constitution of a fuel cell stack power generation system of the present invention.

The above cell stack is assembled into a fuel cell stack power generation system so as to constitute what is shown in FIG. 3. The cell stack 301 is located at the center of the system, and fuel is fed from a reformer 302 to the cell stack 301 via a fuel flow line 311. At the mid way of the fuel flow line 311, a flow rate controller 310 comprising an open/close device is disposed for permitting or stopping the fuel feeding. As the reactive substances supplied to the reformer 302, organic fuels such as coal gas and kerosene can be used. As the flow rate controller 310 comprising the open/close device, a valve is generally used. As the open/close device other than the valve, the mass flow controller or the like can be used. After the fuel is oxidized at the anode in the cell stack 301, the exhaust gas thereof is returned to the reformer 302 via a fuel flow line 312.

The reformer 302 can be replaced to a pure hydrogen storage. In this instance, the fuel flow line 312 at the exhaust side can be omitted.

The oxidants such as air and oxygen can be fed to the fuel cell stack from an oxidant supply device 303 via an oxidant flow line 314. A fan, a blower or an air cylinder can be used as the oxidant supply device 303. At the mid way of the oxidant flow line 314, a flow rate controller 313 comprising an open/close device is disposed for permitting or stopping the oxidant feeding. When the flow of the oxidant can be stopped by closing the oxidant supply device 303, the flow rate controller 313 comprising the open/close device can be omitted.

After the oxidant has passed through the cathode flow channels in the cell stack 301, the oxidant is exhausted from the oxidant flow line 315 to the outside of the cell stack 301 as it is or exhausted after being passed through the heat exchanger 304. As a coolant for the heat exchanger 304, cool wind supplied from a fan, circulating water from a water heater can be utilized.

External terminals (for positive electrode and negative electrode) of the cell stack 301 are connected to an external current controller 316. The external current controller 316 is provided with, other than a load device 306 such as an inverter that is operated during normal operation, a short circuiting device 307 or a DC power source 308. Inside the external current controller 316, the operation of the load device 306, the short circuiting device 307 and the DC power source 308 are controlled through a change over switch 305.

Further, at the time of start of the fuel cell stack, it is designed so that either the short circuiting device 307 or the DC power source 308 is operated via the change over switch 305. Still further, electric power necessary for operating the short circuiting device 307 or the DC power source 308 is supplied from a secondary battery or an electric power system.

In order to carry out the start method of the present invention, it is designed that the reformer 302, the air supply device 303, the flow rate controllers 310, 313 comprised of the open/close devices for fuel and oxidant, the change over switch 305, the load device 306, the short circuiting device 307 and the DC power source 308 can be controlled by signals generated from the computing circuit 320 via signal lines 321.

Before explaining a specific example of start sequence of the present invention, it will be necessary to explain the present invention's concept for dissolution the two technical problems. When the start method of the present invention applied, it is understood that the following behavior occurs inside the unit cell. As a result, it is possible to effectively prevent cathode deterioration due to local current and reverse current.

At first, in the first step, forming a water coating (of generated water) on the surfaces of catalyst particles in the cathode, thereby it can make difficult that oxygen reaches the surface of the cathode catalyst. The water coating can be easily formed by short circuiting the external terminals of the cell stack while feeding the fuel to the anode but not feeding the oxidant to the side of cathode. In this operation, since it is sufficient that the generated water covers the surface of the cathode catalyst in an extremely thin film shape, it is enough to use an extremely small amount of oxygen. The present method is different from that of positively consuming oxygen.

When performing the above short circuiting, if no fuel exists in the anode flow channels, it is feared that the anode potential rises due to the short circuiting current and in association therewith oxidation reaction between the anode catalyst and the electric conductive material is caused. For example, when an anode catalyst consisting of a platinum catalyst and carbon is used, it is necessary that the anode potential has to be kept not exceeding the electric double layer region of platinum (the electric double layer region is of 0.4~0.6V with reference to hydrogen equilibrium potential with regard to hydrogen concentration in fuel). Because if the potential is kept higher than the above, it can result in an advanced stage of the resolving reaction of the platinum as well as the oxidation reaction of the carbon. Accordingly, it is important that the fuel feeding should be done before the fuel in the anode channels has been consumed.

When there exists necessary hydrogen in the anode flow channels in advance, by merely operating the change over switch 305 to thereby connect the short circuiting device 307 and the cell stack 301 to each other and flow short circuiting current, a water coating can be formed on the surface of catalyst particles of the cathode. A current consuming circuit to which a resistor is assembled can be used as the short circuiting device 307. Such method can be realized in a PEFC power generation system that is driven by pure hydrogen. This is because the volume where the fuel for the fuel cell stack exists is large and the short circuiting operation is completed with a small amount of current flow under where the generated water covers the surface of cathode catalyst in an extremely thin film shape.

When restarting after long stop period of the system or starting immediately after exchanging the cell stack, there exists substantially no fuel in the fuel piping. When starting in such fuel shortage condition, it is desirable to feed the fuel to the cell stack 301 at almost the same time when operating the change over switch 305 so that the short circuiting device 307 and the cell stack 301 are connected to each other. At this instance, it is suitable to feed the fuel in short time so that the anode potential does not exceed the electric double layer region. The most desirable practicing method is that the control circuit sets the execution timing so that the short circuiting device 307 is activated after feeding the fuel and immediately before the fuel is introduced to the anode in the cell stack 301. For preventing the cathode deterioration due to the reverse current, it is particularly important to carry out ON-operation of the short circuiting device 307 before the fuel rushes into the flow channels of the unit cell.

The current value when carrying our the short circuiting can be set in any patterns depending on specifications of resistance values and elements in the short circuiting device 307, and the short circuiting is continued until the potential difference between the anode and cathode drops below 0.1V finally. More preferably, it is desirable that the short circuiting current becomes substantially zero, namely, the potential difference above becomes substantially zero. Because when the potential difference is more than 0.1V, the amount of the water coating is insufficient, and the water evaporates into vapor phase existing in the cathode flow channels. Further, the short circuiting current is further desirable to be as large as possible, because the generated water coating can be selectively formed on the surface of the cathode catalyst with a small amount of electricity. The short circuiting current is set at more than 1/10 of the rated current value more preferably more than 25% of the rated current value. When expressing this by current density with respect to the cathode area of a unit cell, the density is more than 0.01 mA/cm$^2$ more preferably more than 0.025 mA/cm$^2$.

A generated water coating can be formed on the cathode with the short circuiting operation of the first step as explained above. By means of this short circuiting operation, it is possible to advance the hydrogen oxidation reaction according to formula 1 at the upstream of the anode flow channels and the oxygen reduction reaction according to formula 2 at the opposite face to the flow channels via the MEA (namely, the anode face) for a short time. However, the electrons necessary for the formula 2 reaction are not supplied from the oxidation reaction (formulas 3, 4) at a cathode located downstream of the cathode channels, but supplied directly from adjacent another unit cell. These electrons represent an oxidation current according to formula 1 at the anode of the corresponding position. The reason why the electrons are supplied from the adjacent cell in this manner is that the distance between adjacent cells is smaller than the distance from the downstream position of the cathode flow channels in the same cell and the relative electrical resistance thereof becomes small.

Further, when the cathode is already coated by the generated water, the above first step's operation can be omitted. Whether or not the step can be omitted can be easily confirmed from conditions where the existence of hydrogen in the anode flow channels is already known in advance and the terminal voltage of the cell stack is close to zero, more precisely the voltage of the respective cells is less than 0.1V. As an example of such special circumstances, such prior condition can be exemplified wherein a PEFC power generation system was operated immediately before, stopped once and is ready to restart in a comparatively short time. When the stopping operation prior to the restarting forms a generated water coating on the cathode, the stopping operation can be considered as the first step of the present invention.

After forming the generated water coating on the cathode, the fuel feeding can be once stopped.

The second step is of a step of forming an oxide layer on the surface of cathode catalyst that is covered by the generated water. An object of this step is, when the oxidant is fed thereafter to the cathode flow channels, to avoid the generated water to evaporate to the side of the oxidant and at the same time to avoid the potential of a cathode locating upstream of the cathode flow channels to rise rapidly. Provided that the cathode potential rises rapidly, the deterioration reaction due to oxidation of the downstream cathode according to formulas 3, 4 advances.

When the cathode is constituted by platinum catalyst and carbon electroconductive material, a method of forming oxide coating on the surfaces of the platinum particles can be used as a means for carrying out the above second step. When the oxide coating is formed in advance in this manner, even when the generated water disappears due to evaporation, the potential hardly rises. An important object of the second step is to form oxide on the surface of the cathode catalyst under a condition where the surface of the cathode catalyst is covered by the generated water, in other words, under a condition that the cell voltage is equal to of less than 0.1V. The voltage application method cannot be practiced on a fuel cell stack of cathodes which are not coated generator water.

The formation of the oxide coating on the surface of the cathode catalyst can be performed by connecting the cell stack 301 and the DC power source 308 through operation of the change over switch 305. At this time, the terminal voltage is set depending on the kinds of the catalyst. For example, when a platinum catalyst is used, the voltage is set to be higher than the potential region of the electric double layer (which is given by 0.4~0.6V with reference to hydrogen equilibrium potential with regard to hydrogen concentration in fuel) and equal to or less than the oxidation onset potential of the electro conductive material (about 0.9V with reference to hydrogen equilibrium potential). By extracting electrons from the cathode by means of the DC power source 308, Pt(OH)$_2$ (formula 5) or PtO (formula 6) can be formed on the surface layer of Pt.

$$Pt+2H_2O \rightarrow Pt(OH)_2+2H^++2e^-  \qquad \text{formula 5}$$

$$Pt+H_2O \rightarrow PtO+2H^++2e^- \qquad \text{formula 6}$$

In the above reactions, when the potential becomes lower than the potential of the oxygen generation reactions (about 1.2V with reference to hydrogen equilibrium potential), after the polarization by the DC power source, the current gradually decreases, and the reaction according to formula 5 or 6 automatically stop. Thereby, the final timing of the oxide coating formation can be easily known.

At this moment, since oxidation reaction advances at the cathode, and water electrolysis reaction (reaction of generating hydrogen from water) advances at the opposite face (anode) of the MEA, the anode never suffers to any damages. Accordingly, in the second step, the supply of hydrogen to the anode can be continued from the first step or can be stopped once.

Further, the cathode potential tends to approach to a potential under an open circuited condition (from 1 to 1.1V) after the oxidant feeding in the third step that will be explained later. Accordingly, it is necessary to take out current quickly in a fourth step after the oxidant feeding. Although this current can be consumed by the short circuiting device 307 as shown in FIG. 3, because of loss due to Joule's heat generation, it is desirable to quickly connect the load device 306 and the cell stack 301. For this purpose too, by controlling the high cell voltage that permits to farm the oxide coating on the surface of the platinum particles in the second step, it becomes possible to reduce power outputted from the cell stack in the successive third and fourth steps as much as possible. Accordingly, when the terminal voltage is controlled to be equal to or higher than the potential region of the electric double layer and equal to less than the oxidation start onset of the electroconductive material in the second step, a large rushing current to the load device 306 can be suppressed. As a result, it is possible to prevent damaging of the load device 306 and avoid upsizing of the load device 306 for consuming with the large current.

As a different condition from the second step of the present invention, there will be an idea to set the cathode at a negative region compared to the hydrogen equilibrium potential by means of the DC polarization. However, if the second step is set in such condition, a sudden potential rise occurs immediately after the oxidant feeding, and the cathode suffers to an unrecoverable damage. In particular, an oxidation reaction (formulas 3, 4) for compensating the electrons in formula 2 reaction advances in the downstream side of the cathode flow channels.

Further, as another different condition, when the cathode potential is set at the region of the electric double layer by means of the DC polarization, a large current must be fed to the cell stack immediately after the oxidant feeding in order to maintain the potential in the region of the electric double layer. The load device 306 is subjected to a great burden and is likely to be damaged.

Further, as a still another different condition, when the cathode potential is set equal to or more than the oxidation onset potential of the oxidant, the electroconductive material is oxidized by the DC polarization, and an electron network of the cathode is destroyed. Even when the DC polarization is omitted, the same phenomenon will occur.

From the above, in the second step, the cathode catalyst is oxidized in the second step (formulas 5, 6). It is possible to prevent oxidation of the electro conductive material thereof by adjusting the cathode potential at a potential where oxidation of the conductive material is not permitted, and thereby it is possible to avoid the cathode deterioration at the time of the oxidant feeding. In the present invention, in consideration of variation of cell voltage due to history difference during stop period and during storage period of the system, the cathode potential is controlled in a range of 0.5~0.8V. When the variation of the cell voltage is small, the lifetime of the fuel cell stack can be further prolonged by controlling the cathode potential in a range of 0.6~0.8V.

By carrying out the operations of the first and second steps before the oxidant feeding, the system becomes a start standby condition, thereby the operation of the oxidant feeding in third step can be practiced and the operation of taking out a load current from the fuel cell stack in the fourth step can be practiced. Herein, the amount of the oxidant feeding can be increased in a step manner or the amount of the oxidant in flow rate corresponding to the rated power generation can be fed at once. Further, with regard to the time interval between the third step and the fourth step, it is desirable to start the fourth step at the same time when the oxidant gas has passed through the cathode flow channels in the cell stack or at almost the same time immediately before the gas rushes into the cathode flow channels.

In the last fourth step, a load current is extracted from the fuel cell stack. Before extracting the load current, it is necessary to feed the fuel to the fuel cell stack. This indicates that the fuel feeding can be continued from the first step, or after stopping the fuel feeding once at the intermediate process of the second step and/or third step, the fuel supply can be restarted immediately before the fourth step starts.

Further, as methods of consuming the load current (power supplied from the fuel cell stack) in the fourth step, a method can be employed in which the cell stack 301 and the short circuiting device 307 are once connected and the power from the cell stack 301 is temporarily consumed in the short circuiting device 307. However, since the amount of heat generated is large, it is desirable to couple the cell stack 301 with the load device 306 quickly.

By carrying out the first step through the fourth step of the present invention, the prevention of oxygen reduction by the water coating and the protection of the catalyst surface by the oxide can be realized, and the cathode oxidizing deterioration due to the reverse current and the local current can be effectively avoided. Further, as has been explained, when the cathode is already covered by water, the first step can be omitted.

Based on the start mechanism as has been explained hitherto, in the present embodiment, further explanation will be done as to a result of verification on existence or absence of an output reduction in the fuel cell stack due to the start-stop cycle by making use of the above battery.

Figure 4:
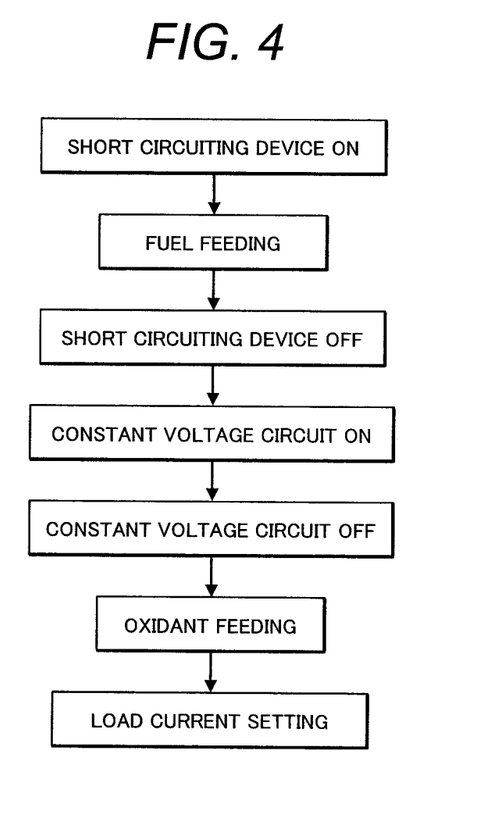
FIG. 4 is an example of start sequence of the present invention.

FIG. 4 is a typical example of start sequence when whether the cathode is covered by generated water is unknown. It is assumed that the cathode channels are filled with atmospheric air.

At first, in the first step, the short circuiting device (307 in FIG. 3) is turned ON, and the fuel feeding is carried out. For changing over to the short circuiting device 307, the change over switch 305 as shown in FIG. 3 is used. Through this operation, the cathode is covered by generated water to protect the same. After confirming that the current becomes substantially zero or the unit cell voltage becomes below 0.1V, the short circuiting device 307 is turned OFF, and the first step is finished.

In the second step, the DC power source (DC power source 308 in FIG. 3) is turned ON. Although the cathode set potential with reference to the anode potential at this moment causes to form an oxide coating on the cathode catalyst (formulas 5, 6), but the set potential is of a potential where the electroconductive material is not oxidized. As an example, the voltage for forming the oxide is set at 0.7V in average per unit cell. At the time point when the current becomes substantially zero, the end point of the oxide formation reaction is recognized. Then, the DC power source 308 is turned OFF, and the second step is finished.

In the subsequent third step, the oxidant is fed to the fuel cell stack (cell stack) 301 as shown in FIG. 3. In the present embodiment, it is exampled that the fuel feeding from the first step continuously done until the third step. Instead of the above example, the fuel feeding can be stopped at the same time when the first step is finished, and the fuel feeding can be done again at the same time when the oxidant feeding in the third step is done.

Further, in the present embodiment, a reformed gas consisting of 70% hydrogen and 30% carbon dioxide is used as the fuel and air is used as the oxidant. The feeding flow rates of these are respectively set at a fuel flow rate and at an air flow rate to be fed for obtaining a rated output of 1 kW. When setting the rated current as 60 A, the fuel utilization rate was 85% and the oxidant utilization rate was 55%.

Subsequently, the fourth step is carried out as soon as possible after the third step or substantially at the same time with the third step, and extraction of load current from the cell stack 301 is started. Although for the extraction of the load current it is preferable to use the load device (load device 306 in FIG. 3), a resistor circuit such as the short circuiting device 307 can be used generally instead of the device.

Figure 5:
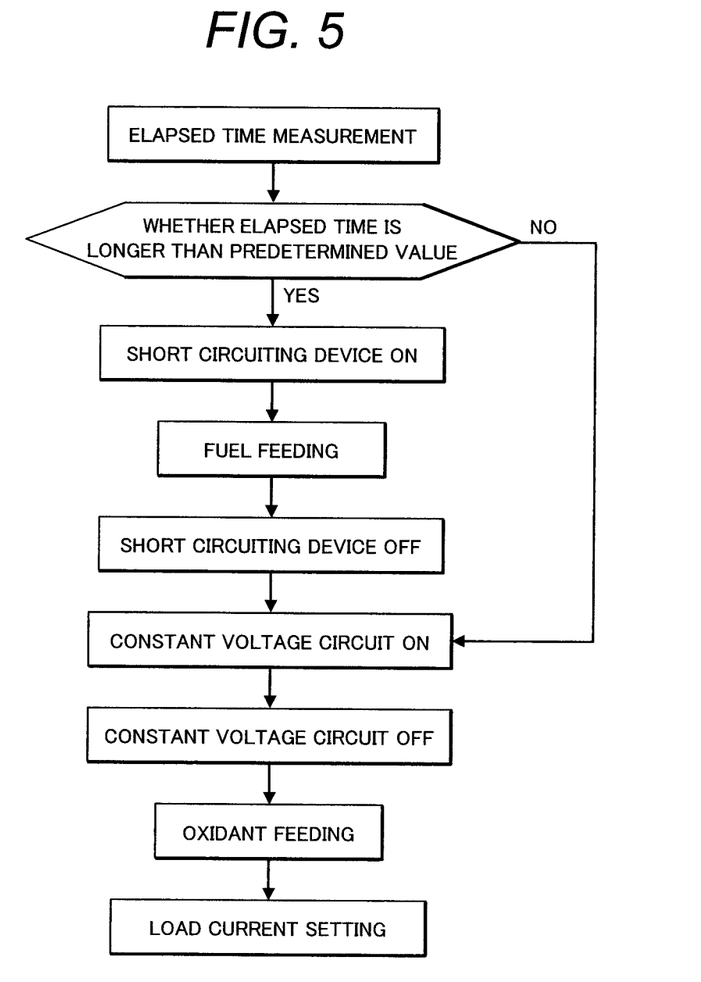
FIG. 5 is another example of start sequence of the present invention.

FIG. 5 is a typical example of start sequence that can be applied when what the cathode is already covered by generated water is known. It is assumed that the anode flow channels are filled with the fuel and the cathode channels are filled with the atmospheric air.

For the first time, elapsed time from the previous stop time of the cell stack to the present time is measured. This can be performed by providing a timer function to a microcomputer in the fuel cell stack power generation system.

When the lapsed time is shorter than a predetermined value, the surface of the cathode since is still covered by generated water, the first step can be omitted.

This predetermined time can be determined by feeding the fuel to the anode after the storage condition of the fuel and by detecting whether the cell voltage of the fuel cell stack rises. Namely, such cell voltage rising after the fuel feeding indicates that the cathode potential has reached high. When the rising band of the cell voltage exceeds the electric double layer region (which corresponds to 0.4~0.6V as a cell voltage), it is judged that the generated water is completely released from the cathode. The predetermined time is set at least within a time period where the cell voltage does not exceed 0.6V. In consideration of long period durability, it is desirable to set the above predetermined time within a time period wherein the rising band of the cell voltage can be kept below 0.4V.

Figure 6:
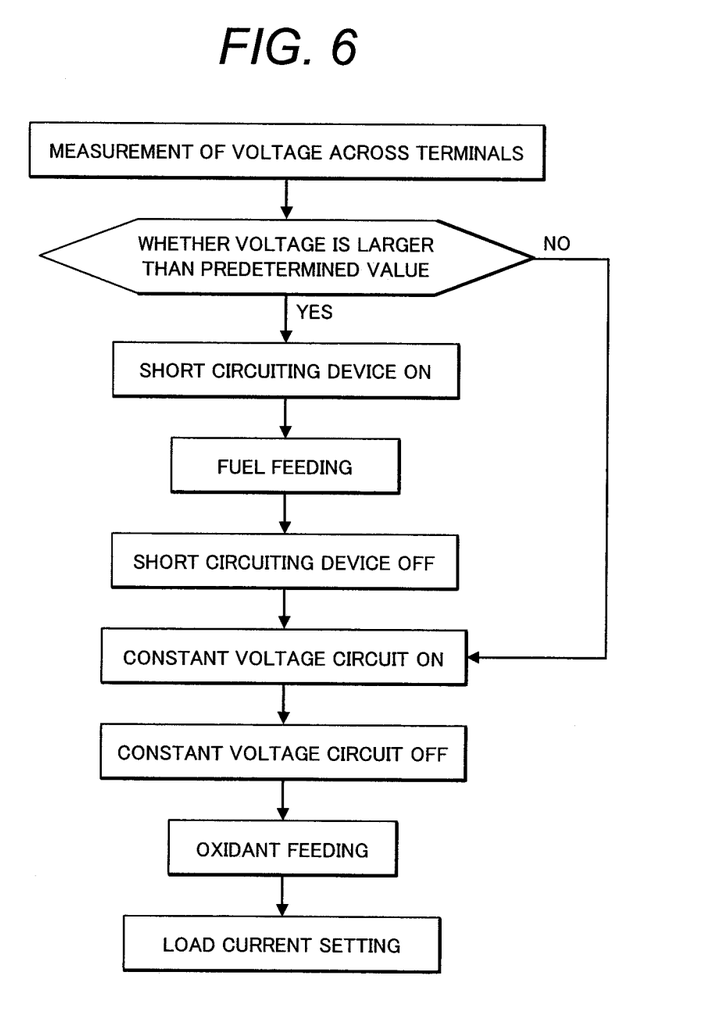
FIG. 6 is a still another example of start sequence of the present invention.

Further, as a further easy and convenient method, a judgment method according to variation of the terminal voltage can be employed. The details of which will be explained later (FIG. 6).

When the elapsed time with reference to the previous stop time point of the cell stack becomes longer than the predetermined value, the first step (short circuiting device ON, fuel supply, and short circuiting device OFF) is carried out as shown in FIG. 4.

Further, it is desirable to perform the first step after piping or a cell stack is exchanged, since generated water does not completely cover the surface of the cathodes of the cell stack.

After the second step, since the sequence thereof is the same as that explained in FIG. 4, the explanation thereof is omitted herein. It is assumed that the fuel is continuously fed to the fuel cell stack immediately before the setting of the load current.

Next, explanation will be done of a means for judging from the cell voltage as to whether the first step can be omitted will be explained. FIG. 6 is an example of start sequence, which takes notes of the cell voltage, namely the terminal voltage of the cell. In this instance, through monitoring the terminal voltage, whether the generated water exists on the cathode is judged. Whether the existence or the absence of the generated water in all of the cells can be judged by measuring the respective cell voltages. When the fuel exists on the anode, the cathode potential is measured with reference thereto, and it can be confirmed that the measured potential is below the predetermined voltage. Thereby, it can be judged that the cathode is covered by the generated water and is protected.

In actual operation, since it is desirable to be able to judge easily and conveniently with the terminal voltage, the product of a threshold value for the respective cells and the number of cells can be determined as the reference voltage for the terminal voltage. Further, when performing this measurement, it can be done by providing with a voltage measurement device for measuring the terminal voltage of the fuel cell stack 301.

The predetermined voltage is to be set in a range where the average cell voltage does not exceed the electric double layer region (which corresponds to 0.4~0.6V as a cell voltage). The average cell voltage larger than the predetermined voltage leads to a judgement that the generated water is completely released from the cathodes. The predetermined voltage is set in a range where the cell voltage does not exceed 0.6V. In consideration of long period durability, it is desirable to set the above predetermined time within time where the rising band of the cell voltage can be kept below 0.4V. It is further desirable to set at a voltage (product of 0.1V and the number of cells) wherein an average cell voltage becomes below 0.1V.

The first operation of the sequence as shown in FIG. 6 is to measure the terminal voltage and judge whether the measured value is within the predetermined value or not. The predetermined value corresponds to the above explained reference voltage.

When the terminal voltage exceeds the predetermined value, the first step same as in FIG. 4 is performed. When the terminal voltage is below the predetermined value, the first step can be omitted. Thereafter, when the operations corresponding to second through fourth Thereafter, when the operations corresponding to second through fourth steps as in FIG. 4 are carried out successively, the cell stack can be started.

Among the sequences as explained above, the sequence in FIG. 4 is selected as a standard start method, and the start-stop cycle test was done for the above mentioned cell stack.

At first, hot water of 70° C. is circulated through the cell stack as shown in FIG. 2, and a power generation test was done by using mixture gas of 70% hydrogen and 30% carbon dioxide as fuel and by feeding air as oxidant. The current collector plate terminals of the fuel cell stack are connected to an inverter (which corresponds to the load device 306 in FIG. 3) via cables. Further, the inverter was connected to an AC type electronic load device so as to permit power consumption from the cell stack.

Further, the power generation test of the fuel cell stack was done under conditions of fuel utilization rate of 85%, oxidant utilization rate of 55%, current of 60 A and power generation time of 5 hours.

Next, a power generation stopping operation was done. The stopping operation was done by making use of the short circuiting device 307 of FIG. 3, and the current is continuously flowed until the cell voltage drops below 0.1V. The resistance value in the short circuiting device 307 is set so that when the cell voltage is 0.8V, the rated current flows through the short circuiting device.

After finishing the short circuiting operation, the battery is rapidly cooled with cooling water of which inlet temperature is selected to be at 30° C. The temperature of the stack becomes at 30° C. after about one hour, the temperature of the inlet cooling water is increased to 70° C. Then the previously explained power generation test was started again. In this manner, the start-stop cycle test in which power generation and cooling are repeated was done 200 times.

As a result, an output reduction rate after 200 times cycle tests were below only 0.1% with respect to the initial rated output.

While nitrogen purging is immediately applied to the anode after the same stopping method above, 200 times start-stop cycle tests were done with the start method in which the first step is omitted from the start sequence in FIG. 4. As a result, an output after 200 times cycle tests lowered by 8% with respect to the initial value.

Next, 200 times start-stop cycle tests were done with the same stopping method above and the start method in which the second step is omitted from the start sequence in FIG. 4. As a result, an output after 200 times cycle tests lowered by 5% with respect to the initial value.

Further, a cell stack having the same specification as used for the above start-stop cycle test was newly produced, and the start sequence as shown in FIG. 5 was carried out. Compared the method of FIG. 5 with the above explained sequences in which either the first step or the second step is omitted, the output reduction rate of FIG. 5 method is below 0.1%, and if one of either steps was omitted, an output lowering of 5~8% was caused.

Further, another cell stack having the same specification as used for the above start-stop cycle test was newly produced, and the start sequence as shown in FIG. 6 was carried out. Compared method of FIG. 6 with the above explained sequences in which either the first step or the second step is omitted, the output reduction rate of FIG. 6 method is below 0.1%, and when one of either steps was omitted, an output lowering of 5~8% was caused.

With the start methods of the present invention as has been explained hitherto, an output reduction can be prevented. Further, equipment, surrounding circuits and control devices for carrying out the respective steps can be selected arbitrarily only if the respective steps can be performed. The present start method is a method particularly effective for starting a solid polymer type fuel cell stack using fuel containing hydrogen.

Lastly, in the case of the other fuels such as methanol, the cathode deterioration is possibly caused by the local current and the reverse current under a condition where no fuel exists in the anode flow channels. The present invention can be applicable to the fuel cell stack above using such liquid fuel.

EXPLANATION OF REFERENCE NUMERALS

101 Anode
102 Cathode
103 Electrolytic membrane
104 Separator having fuel flow channels
105 Fuel flow channel
106 Separator having oxidant flow channels
107 Oxidant flow channel
108 Anode side gasket
109 Cathode side gasket
201 Unit cell
202 Membrane-electrode assembly (MEA)
203 Flat plate part facing cooling water flow channel
204 Separator of present invention (used for unit cell)
205 Gasket (seal)
207 Insulator plate
208 Cooling cell 209 End plate
210 Fuel feeding connector
211 Oxidant feeding use connector
212 Cooling water feeding use connector
213, 214 Current collector plate
216 Bolt
217 Spring
218 Nut
219 Separator having cooling water flow channels
222 Fuel exhausting use connector
223 Oxidant exhausting use connector
224 Cooling water exhausting use connector
301 Cell stack
302 Fuel producing device (reformer)
303 Oxidant supply device
304 Heat exchanger
305 Change over switch
306 Load device
307 Short circuiting device
308 DC power source
310 Flow rate controller
311 Fuel flow line (Feed side)
312 Fuel flow line (Exhaust side)
313 Flow rate controller
314 Oxidant flow line (Feed side)
315 Oxidant flow line (Exhaust side)
316 External current controller
320 Computing circuit
321 Signal line

The invention claimed is:

1. A start method of a solid polymer type fuel cell stack that is comprised of a separator including an anode flow channel for flowing a fuel, another separator including a cathode flow channel for oxidant feeding, and electrodes and an electrolyte which are interposed between the separators; the method is characterized by
   a first step of making a short circuit in external terminals of the cell stack and feeding the fuel to each anode of the cell stack,
   a second step of, after a cell voltage of the cell stack becomes equal to or less than 0.1V by performance of the first step, applying a DC voltage to the external terminals of the cell stack,
   a third step of feeding oxidant gas to each cathode of the cell stack, and
   a fourth step of extracting a load current from the fuel cell stack.

2. The fuel cell stack start method according to claim 1, characterized by, in the first step, judging whether or not a time difference between a latest stop time of the fuel cell stack and a current time exceeds a predetermined time period, and when judging that the time difference exceeds the predetermined time period, carrying out an operation of flowing current to the fuel cell stack by making use of an external current control means.

3. The fuel cell stack start method according to claim 1, characterized by, in the first step, judging whether or not voltage between terminals of the fuel cell stack exceeds a predetermined voltage, and when judging that the voltage exceeds the predetermined voltage, carrying out an operation of flowing current to the fuel cell stack by making use of an external current control means.

4. The fuel cell stack start method according to claim 1, characterized by, in the second step, carrying out an operation of flowing current to the fuel cell stack by making use of an external current control means.

5. The fuel cell stack start method according to claim 4, characterized in that the external current control means is one for applying a DC voltage between voltage terminals of the fuel cell stack and the DC voltage is set to be equal to or more than 0.5 V and equal to less than 0.8 V.

6. The fuel cell stack start method according to claim 1, characterized by coating a surface of a catalyst of the cathode with water generated by performance of the first step on.

7. The fuel cell stack start method according to claim 6, characterized by forming an oxide layer on the surface of cathode catalyst that is coated with the generated water.

8. A start method of a solid polymer type fuel cell stack that is comprised of a separator including an anode flow channel for flowing a fuel, another separator including a cathode flow channel for oxidant feeding, and electrodes and an electrolyte which are interposed between the separators; the method is characterized by
   a first step of feeding the fuel to each anode of the cell stack,
   a second step of applying a DC voltage to the external terminals of the cell stack,
   a third step of feeding oxidant gas to each cathode of the cell stack,
   a fourth step of extracting a load current from the fuel cell stack,
   wherein, in the first step, when a cell voltage of the cell stack is higher than 0.1V, making a short circuit in external terminals of the cell stack, and
   after the cell voltage becomes equal to or less than 0.1V, moving to the second step from the first step.

* * * * *